April 21, 1970     D. BRESLOW     3,507,445
BATTERY DRIVEN ASHTRAY
Filed Feb. 21, 1968     2 Sheets-Sheet 1
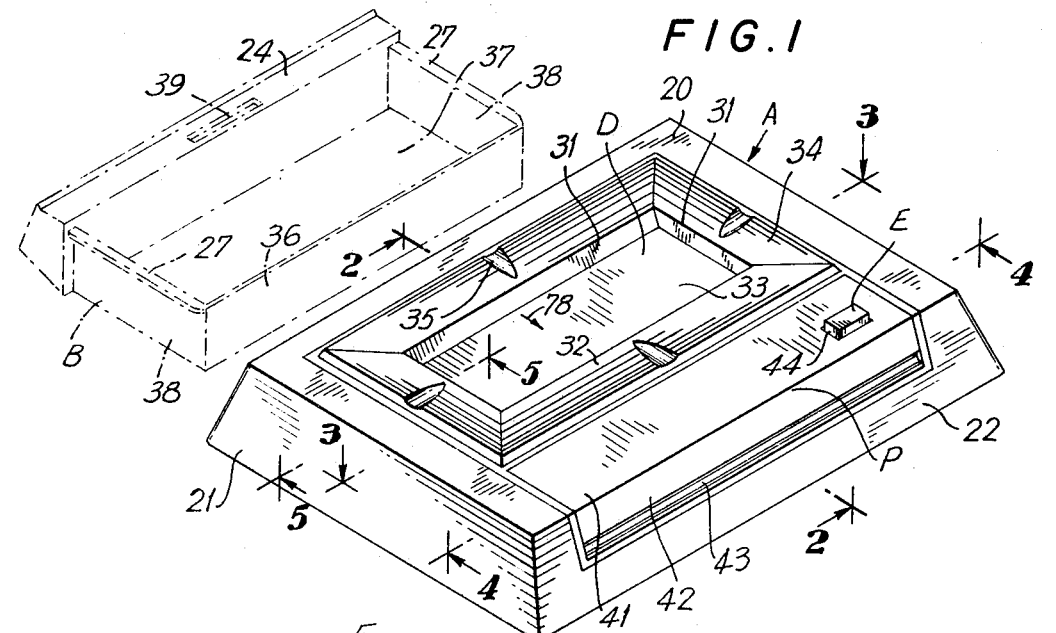
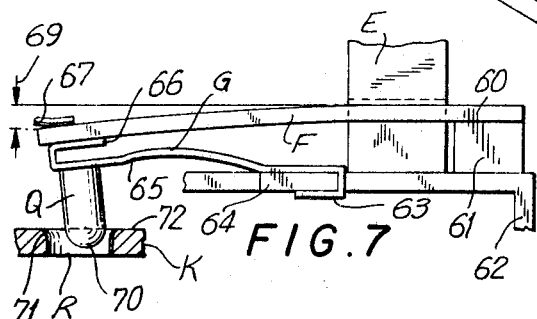
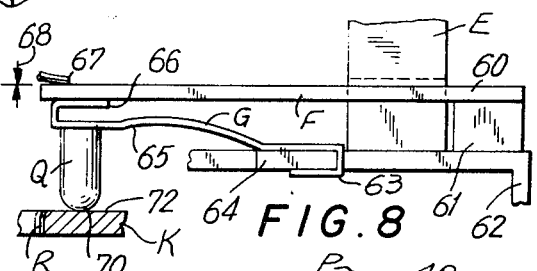
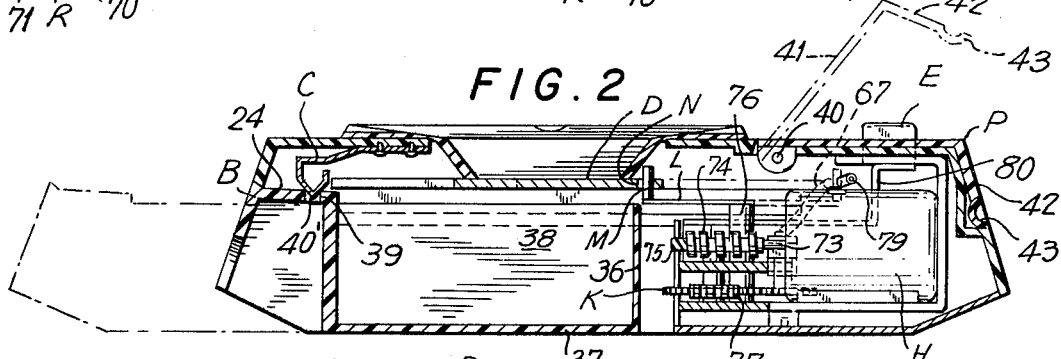
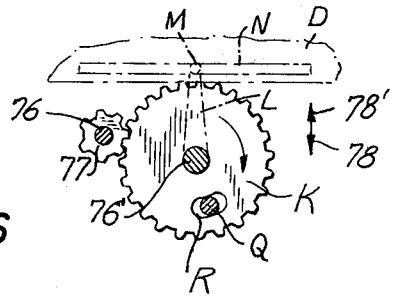
INVENTOR.
DAVID BRESLOW
BY
ATTORNEY April 21, 1970  D. BRESLOW  3,507,445
BATTERY DRIVEN ASHTRAY
Filed Feb. 21, 1968  2 Sheets-Sheet 2
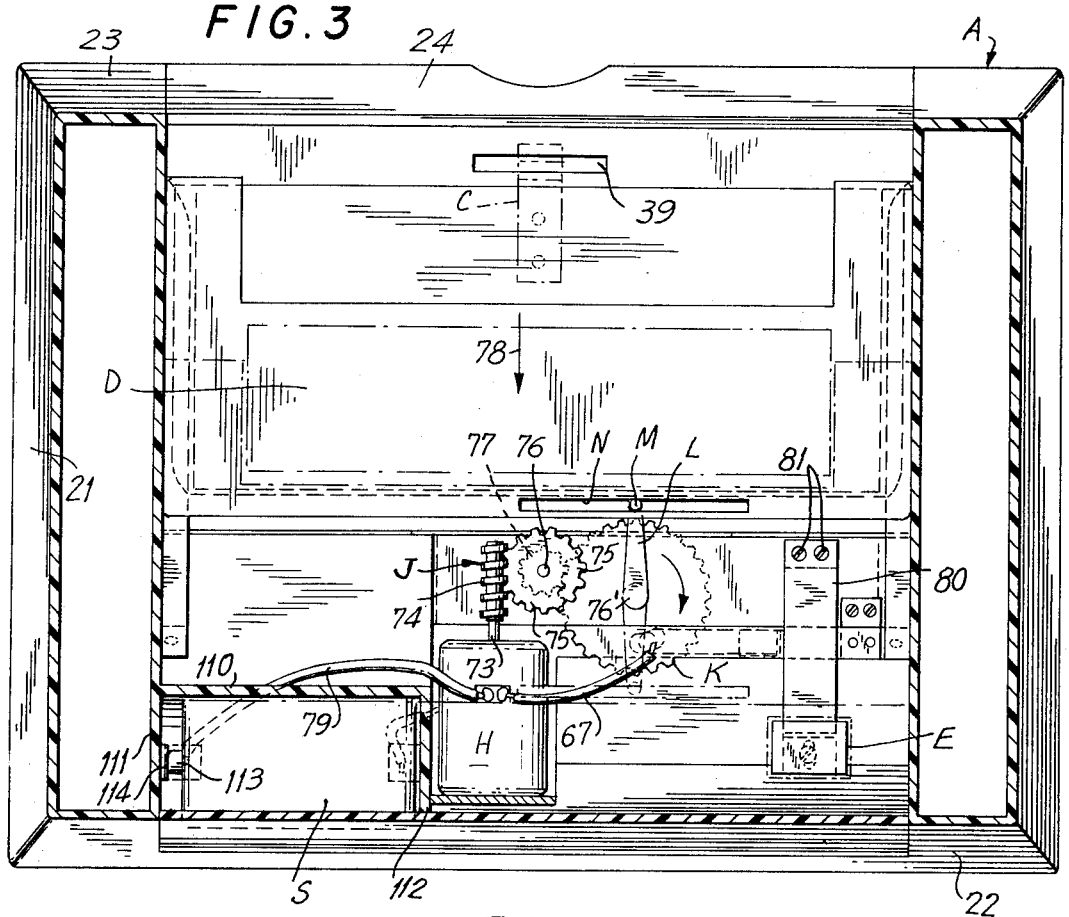
INVENTOR.
DAVID BRESLOW
BY
ATTORNEY

United States Patent Office 3,507,445
Patented Apr. 21, 1970

3,507,445
BATTERY DRIVEN ASHTRAY
David Breslow, 15 W. 26th St.,
New York, N.Y. 10010
Filed Feb. 21, 1968, Ser. No. 707,170
Int. Cl. A24f *19/08*
U.S. Cl. 231—1                                      6 Claims

ABSTRACT OF THE DISCLOSURE

The present disclosure relates to an ashtray having a removable tray, the cover of which is opened or closed by actuation of a battery driven motor which is in turn started in operation by a manually actuated button.

DESCRIPTION OF THE INVENTION

The present invention relates to an electric motor actuated battery driven ashtray.

It is among the objects of the present invention to provide a battery actuated motor driven ashtray, which will be durable, attractive and decorative, and which may be opened or closed by manual actuation.

Another object is to provide a novel automatic ashtray in which the cover may be opened and closed by a simple switch button, permitting ready usage by the smoker without exposure of the debris.

A further object is to provide a novel battery actuated ashtray which may have a receptacle for receipt of cigarette and cigar ashes from smoked cigarettes and cigars and which may be readily opened and closed by simple actuation of an electrically driven cover.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects the entire casing is mounted upon a base structure with four side curtain walls which may slope or be inclined obliquely outwardly downwardly. The enclosure will be provided at one side with an ashtray portion having a sliding cover or closure which will open or close the ashtray enclosure.

The ashtray enclosure may be provided with a removable drawer held in position by a spring catch from the rear of the ashtray. The forward section may consist of a cover which may be lifted to permit access to the mechanism with a switch button. The mechanism, which is enclosed in the front of the ashtray, includes a small motor having an accessible and replaceable battery. The motor, through a worm and wheel and series of gears, will drive a closure drawer which, when withdrawn, will open the ashtray or the drawer in the ashtray to receive ashes or other smoking debris.

The gear, which is driven from the motor, is provided with an opening therein which may receive a contact button when the circuit is open at the end and beginning of the cycle of operation. This contact button is provided with a rounded camming lower portion which will be actuated by the sides of the opening to elevate a contact leaf and establish a circuit until the gear turns 360° and again breaks off the circuit and stops the motor.

The motor will be started by a single pressure on the button and will continue to operate for the full cycle of 360°, which will result in the opening and closing of the ashtray reciprocating sliding cover.

BRIEF DESCRIPTION OF DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top perspective view of the ashtray showing how the drawer may be removed.

FIG. 2 is a transverse vertical sectional view upon the line 2—2 of FIG. 1.

FIG. 3 is a horizontal sectional view upon the line 3—3 of FIG. 1.

FIG. 4 is a transverse sectional view upon the line 4—4 of FIG. 1.

FIG. 5 is a fragmentary transverse sectional view upon the line 5—5 of FIG. 1.

FIG. 6 is a diagrammatic fragmentary top elevational view showing the manner in which the gear and lever open and close the sliding cover, taken upon the line 6—6 of FIG. 4.

FIG. 7 is a fragmentary side elevational view showing the switch arrangement in starting position.

FIG. 8 is a fragmentary side elevational view similar to FIG. 7, showing the switch in starting position.

DESCRIPTION OF THE PREFERRED EMBODIMENT

Referring to the drawings and particularly to FIG. 1, the ashtray A has the removable drawer or tray B. The drawer B is held in position by means of a spring catch C. The drawer B is held in closed position by the spring catch C shown in FIG. 2, and it has a sliding cover D. The drawer B, when in closed position as shown in FIG. 2, will form the receptacle of the ashtray.

The front portion of the ashtray is provided with a manually actuated button E. This button actuates the upper switch lever F to contact the lower switch lever G. As shown in FIGS. 3 and 4, the motor H has a worm and gear J which drives the gear K and the lever L. The lever L has a pin M which fits in the slot N in the sliding cover member D. For each revolution of the gear K, the pin M opens and closes the sliding cover D.

The replaceable battery S is accessible through the lifting cover P. The operation will continue its cycle of opening and closing the slide D until the pin Q drops into the opening R in the gear K.

Referring particularly to FIG. 1, the housing has a flat top 20 with oblique side walls 21 and an oblique front wall 22. The wall 23 has an opening in which is positioned the drawer front 24 when the drawer B is in closed position.

The drawer B has the bottom 37, the sides 58, the back wall 37 and the out-turned flanges 27. These out-turned flanges 27 (see FIG. 5) fit in the guide ways 28 which are formed on the interior side walls 29 forming part of the housing structure. The sliding cover D fits between the in-turned flange 30 and the downturned flange 31 of the insert 32, which, as shown in FIG. 1, forms a well 33 above the sliding cover D inside of the wall portions 31. The oblique side portions 34 are provided with the cigarette or cigar rest recesses 35.

The drawer B fits under the sliding cover D, as shown best in FIG. 1. The front portion 24 of the drawer B is provided with a slot 39 to receive the bottom portion 40′ of the spring catch C, as shown in FIG. 2. The operating mechanism is in the front of the housing and is covered by the hinged lifting wall or cover P which is hingedly mounted at 40. It is provided with a top cover portion 41 and a front oblique cover portion 42, with the finger engagement portion 43. Through an opening 44 in the top portion 41 projects the actuating button E.

The button E, as shown in FIGS. 7 and 8, is mounted above and actuates the top contact leaf spring member F which is mounted at 60 on the insulating block 61, which in turn is mounted on the angular bar 62 (see FIG. 8). The lower leaf spring G is mounted at 63 on the member 64 and it has a forwardly extending bowed portion 65 which carries the pin Q and has an inturned contact portion 66, which will establish a circuit with the upper member F. The conduit to the motor is indicated at 67. As indicated by the double arrows 68 and 69, the button E will be able to move the member F between these two positions to establish a circuit and starting of the operation in the position of FIG. 7, which continues in the position of FIG. 8.

When the button E is pressed down with the pin Q in its position depressed into the opening R under the end of the spring leaf G, a circuit will be established, and this will result in turning of the gear wheel K and camming upward of the pin Q with its spherical face 70 riding up over the camming edge 71 of the opening R in the gear wheel K. This contact will be maintained as shown in FIG. 8 until the pin Q returns to the opening R with the pin Q riding over the top face 72 of the gear K.

When the pin Q again comes opposite the opening R and drops therein, the circuit will be open and the operation stopped. The drive is from the motor H as shown in FIG. 3 through the shaft 73 and the worm 74. The worm 74, as shown in FIG. 3, will drive the gear 75 which is on the shaft 76, also carrying the pinion 77. The pinion 77 meshes with the large gear K on the shaft 76. Also mounted on the shaft 76 is the arm L carrying the pin M.

This pin M rides in the slot N on the inside edge of the reciprocating sliding cover D. As shown best in FIG. 6, the pinion 77, in driving the gear K, will turn the arm L through 360°, causing first withdrawal of the cover D in the direction of the arrow 78 to uncover the receptacle or drawer B, following which the cover D will be moved back, as shown by the arrow 78', to closed position, as indicated in FIGS. 1 and 3.

This movement is sufficiently slow to permit deposit of any cigarette or cigar ashes or other debris into the drawer B.

The circuit from the battery S to the motor H is formed by the conduit 79 shown in FIG. 3 and from the battery to the upper resilient contact member by the conduit 67. In FIG. 4, the switch or contacts are open between the resilient members F and G when the pin Q, as shown in FIG. 4, descends into the opening R in the gear wheel K. The press button E is held by the angle spring member 80, which is mounted on the body structure, as indicated at 81 in FIG. 3. The battery S is replaceably mounted in a receptacle formed by the walls 110, 111 and 112 in FIG. 3. The cover P will cover the receptacle formed by these interior walls.

The battery itself has a pole 113 which contacts the contact member 114 connected with the conduit member 79, and it also has the bottom contact plate 115 (see FIG. 4), which has an angular portion connected to the circuit 117. The contact member K is part of the bent plate or strip 118, which connects to the conduit 79.

As many changes could be made in the above battery driven ashtray, and many widely different embodiments of those invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An automatic ashtray having a casing, a removable drawer serving as a receptacle located in one side of said casing, a reciprocal sliding cover for said receptacle located in said casing, the driving arrangement for said cover at the other side of the casing, including the motor, a battery to drive said motor, a switch to establish a circuit from said battery to said motor to actuate the same, a manual press button to close the switch and means driven by the motor to open the switch after opening and closing of the cover, said means including a gear wheel having a recess therein and said switch consisting of two closely adjacent spring contact members and said button closing said spring contact members from one side of said switch and said switch being provided with means to open and close the switch from the other side, said driving arrangement also including a slot on the inside edge of the cover, a pin riding in said slot and a rotating arm driving said pin through a cycle of 360° driven by said motor.

2. The ashtray of claim 1, said casing having a swinging cover at the side of the casing opposite the drawer to permit inspection of the driving arrangement and replacement of the battery.

3. The ashtray of claim 1, said driving arrangement including a worm and gear driven by the motor and a rotating lever to open and close said sliding cover driven by said worm and gear.

4. The ashtray of claim 1, said motor being positioned at one side of said casing away from said sliding cover and a projecting shaft from said motor extending into the casing horizontally away from the motor and about midway of the width of the ashtray, a worm on said shaft, a gear driven by said worm, a pinion driven by said gear and said gear wheel driven by said pinion, said gear wheel having said recess and said recess receiving a spring-pressed contact member to open said switch and stop said motor.

5. The ashtray of claim 1, said spring contact members being positioned between the motor and above the gear wheel and said button being positioned above the spring contact members adjacent the mounting end thereof and the other end of the lower spring contact member being provided with said means to open and close said switch, consisting of a pin which can reciprocate into and out of the recess in the gear wheel.

6. The ashtray of claim 1, said means to open and close the switch from the other side consisting of a downwardly projecting member riding on said gear wheel when the switch is closed and fitting in said recess in said gear wheel when the switch is open.

References Cited

UNITED STATES PATENTS

| 2,494,979 | 1/1950 | Worthing | 131—242 |
| 2,593,836 | 4/1952 | Bock | 232—43.2 |
| 3,095,108 | 6/1963 | McKenzie | 131—242 |

FOREIGN PATENTS

| 966,007 | 8/1964 | Great Britain. |

FRANCIS K. ZUGEL, Primary Examiner

U.S. Cl. X.R.

131—242; 220—20.5; 232—43.2